No. 734,803. PATENTED JULY 28, 1903.
L. BLUMSTEIN.
TRACTION WHEEL ATTACHMENT.
APPLICATION FILED FEB. 28, 1903.
NO MODEL.
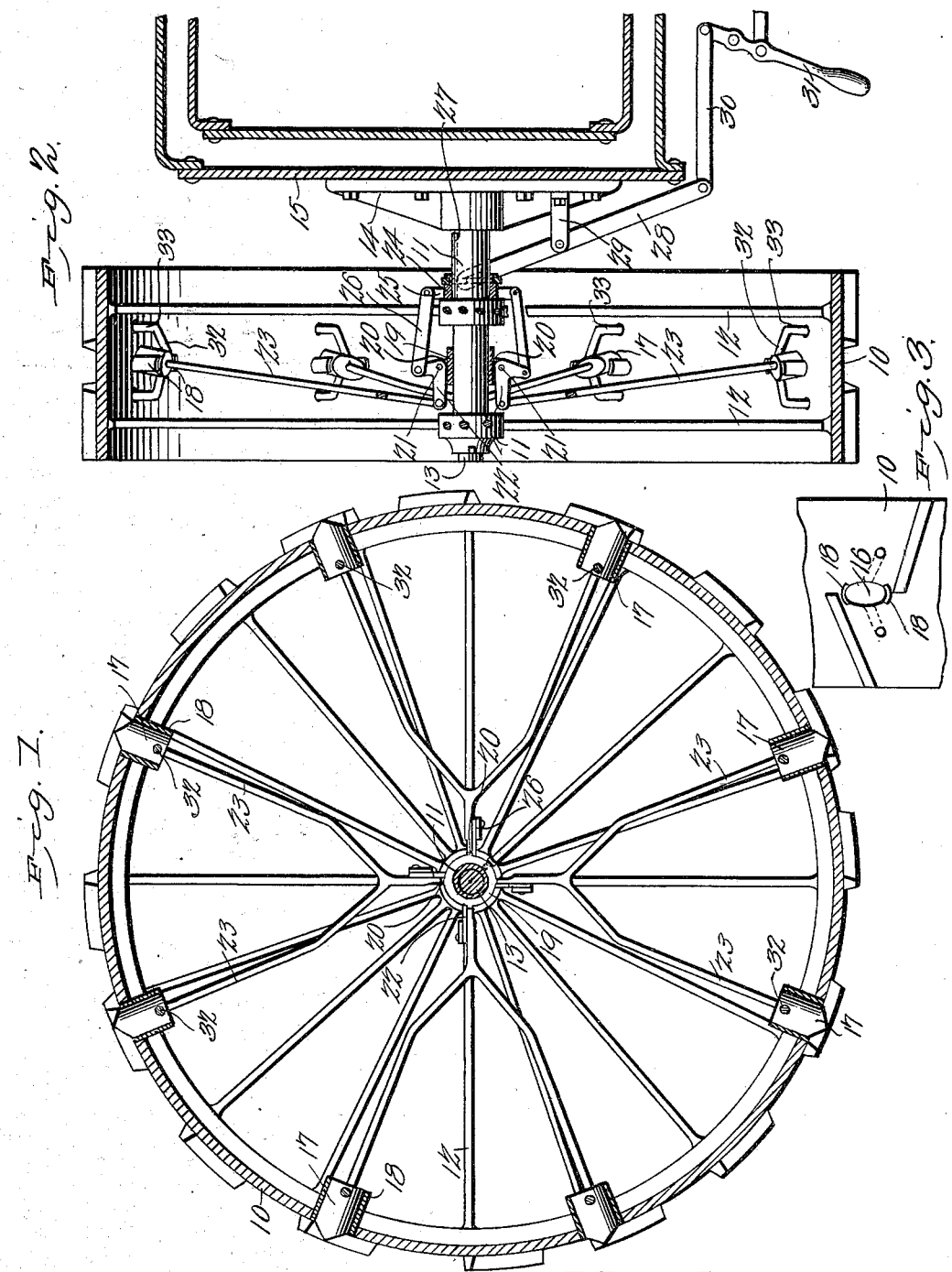
Witnesses
L. Blumstein, Inventor
by C. A. Snow & Co.
Attorneys No. 734,803. Patented July 28, 1903.

UNITED STATES PATENT OFFICE.

LOUIS BLUMSTEIN, OF BRIGHTON, ILLINOIS.

TRACTION-WHEEL ATTACHMENT.

SPECIFICATION forming part of Letters Patent No. 734,803, dated July 28, 1903.

Application filed February 28, 1903. Serial No. 145,543. (No model.)

*To all whom it may concern:*

Be it known that I, LOUIS BLUMSTEIN, a citizen of the United States, residing at Brighton, in the county of Macoupin and State of Illinois, have invented a new and useful Traction-Wheel Attachment, of which the following is a specification.

This invention relates to improvements in traction-wheels, more particularly to the wheels of machines of this character employed in connection with agricultural machinery; and the object of the invention is to provide means for moving blocks out through the rim of the wheel to engage the ground as the wheel is revolved, and thus increase the "grip" when running over certain kinds of soil; and the invention consists in certain novel features of the construction, as hereinafter shown and described, and specified in the claims.

In the drawings illustrative of the invention, in which corresponding parts are denoted by like designating characters, Figure 1 is a side elevation, with the hub and rim in section, illustrating the construction and operation. Fig. 2 is a transverse sectional elevation of a wheel and a portion of the support with the improvement applied. Fig. 3 is a detail of a portion of the rim of the wheel, illustrating the manner of constructing the protruding-block guide.

The improvement may be attached to any form of wheel to which such devices are applicable; but will generally be applied to the relatively large traction-wheels employed upon threshing-machine engines and the like, and for the purpose of illustration it is shown thus applied, 10 representing the rim, 11 the hub, 12 the spokes, and 13 the axle, which is generally of the "stub" order and connected by a bracket 14 to the side of the boiler, (indicated at 15.) The rim 10 will be provided with spaced apertures 16, preferably oval in outline, as shown in Fig. 3, as many being employed as required; but for the purpose of illustration eight are shown. Movably engaging the apertures and adapted for projection therethrough are blocks 17, the blocks forming what are commonly known as "mud-hooks" or "mud-claws" and forming when projected means for additional grips between the wheels and the ground. The apertures 16 are provided with reinforcing-strips 18, preferably of steel and projecting into the interior area of the wheel and forming combined guides and wear-plates for the blocks, the strips thus receiving the strains and preventing undue wear upon the rims of the wheels. These mud-claws are employed when running over soft ground where the wheels would be liable to slip unless some such extra grip means were provided, and as the extra grip means are required only when running over soft ground and would be very detrimental when running over hard ground means are provided for withdrawing them when not required. Each of the blocks may be independently projected and withdrawn; but will preferably be coupled in pairs and adapted to be simultaneously operated, as shown in Fig. 1, the mechanism for actuating the blocks being constructed as follows:

Surrounding the hub 11, between the supporting rims for the spokes 12, is a collar 19, securely fastened to the hub in any suitable manner and provided with ears 20, corresponding to the pairs of blocks 17 and in radial alinement therewith. Pivoted at 21 to the ears 20 are bell-crank levers 22, one arm of each lever connected, respectively, to one pair of the blocks 17 by a rod 23, so that the oscillation of the bell-crank levers will operate the blocks.

Surrounding the hub 11 upon its inner end is a grooved collar 24, having spaced lugs 25 corresponding to the ears 20 and levers 22, and each connected to the other bell-crank-lever arm by a rod 26. The collar 24 is slidable upon the hub 11, but is prevented from turning thereon by a feather-key, (indicated at 27,) and will be operated by a forked lever 28, pivotally connected to the bracket 14 or other portion of the engine or boiler, as by a standard 29, and adapted to be operated in any required manner, as by a system of levers 30 31 convenient to the hand of the engineer.

The bell-crank levers 22 will be so proportioned and arranged that when thrown into their outward positions or with the blocks 17 outward, as in Figs. 1 and 2, the rods 23 will be in longitudinal alinement with the member of the bell-crank lever with which they are connected, and thus form a locking means between the crank-arms and blocks. By this arrangement the strains against the blocks when projected are borne by the rods 23 and crank-levers 22 and not by the operating mechanism.

When applied to axles passing entirely through the machine, the operating-lever system 30 31 may be modified to adapt them to the change of structure, and it will be understood that the operating means may be varied to any required extent to adapt the devices to the varying conditions and structural changes found in the different makes of traction-engines. It will also be understood that the means whereby the bell-crank levers are connected to the wheel may be modified to adapt the devices to the various forms of wheels manufactured and all the parts may be modified to adapt them to the changes in the details of construction of different makes of machines without departing from the principle of the invention or sacrificing any of its advantages.

Attached to each of the mud claws or blocks 17 is a transverse bar 32, having its ends turned outwardly, as at 33, and extending through apertures in the rim 10 of the wheel, the bar and outturned ends serving as additional guides to support the mud-claws.

Having thus described the invention, what I claim is—

1. The combination of a wheel having spaced apertures in the rim, ground-engaging blocks adapted for projection through said apertures, a collar having spaced ears and connected to the wheel-hub, lever-arms pivotally attached to said ears, rods connecting said blocks and lever-arms, and means for forcibly moving said lever-arms into longitudinal alinement with said rods, substantially as described.

2. The combination of a wheel having spaced apertures in the rim, ground-engaging blocks adapted for projection through said apertures, a collar connected to the hub of said wheel, lever-arms pivotally connected to said collar, rods connecting said lever-arms with said ground-engaging blocks, and means for forcibly moving said lever-arms into longitudinal alinement with said connecting-rods, substantially as described.

3. The combination of a wheel having spaced apertures in the rim, ground-engaging blocks adapted for projection through said apertures, a collar connected to the hub of said wheel, lever-arms pivotally connected to the said collar, rods connecting said lever-arms with said ground-engaging blocks, a collar movable in horizontal alinement with the axis of said wheel, and connecting means between said collar and lever-arms, whereby the movement of said collar will move said lever-arms into alinement with said connecting-rods and ground-engaging blocks, substantially as described.

4. The combination of a wheel having spaced apertures in the rim, ground-engaging blocks adapted for projection through said apertures, a collar having spaced ears and connected to the wheel-hub, lever-arms pivotally mounted between said ears, rods connecting said blocks and lever-arms, a collar mounted for rotation with said wheel and movable longitudinally relative to the axis thereof, rods connecting said collar and lever-arms, and means for forcibly operating said movable collar, whereby said ground-blocks may be projected and locked in their projected position, substantially as described.

5. The combination of a wheel having spaced apertures in the rim, ground-engaging blocks adapted for projection through said apertures, bell-crank levers movably mounted within said wheel, forked rods connecting said blocks in pairs with single arms of said levers and means connected with the other arms of said bell-crank levers for forcibly moving the first-mentioned lever-arms into longitudinal alinement with said forked connecting-rods.

6. The combination of a wheel having spaced apertures in the rim, ground-engaging blocks adapted for projection through said apertures, bars extending laterally from said blocks and having ends extending through spaced apertures in the wheel-rim, lever-arms movably mounted within said wheel, rods connecting said blocks with said lever-arms, and means for forcibly moving said lever-arms into longitudinal alinement with said connecting-rods, whereby said blocks may be projected and locked in their projected position, substantially as described.

In testimony that I claim the foregoing as my own I have hereto affixed my signature in the presence of two witnesses.

LOUIS BLUMSTEIN.

Witnesses:
WM. H. SCHELM,
CHARLES DALME.